United States Patent [19]

Wendelboe

[11] 4,295,369

[45] Oct. 20, 1981

[54] DUAL MAGNETIC DRIVE FOR GEAR METERS

[75] Inventor: Fred E. Wendelboe, Erie, Pa.

[73] Assignee: Geosource Inc., Houston, Tex.

[21] Appl. No.: 138,985

[22] Filed: Apr. 10, 1980

[51] Int. Cl.³ ............................................. G01F 3/08
[52] U.S. Cl. ..................................................... 73/261
[58] Field of Search ........................................ 73/261

[56] References Cited

U.S. PATENT DOCUMENTS

| | | | |
|---|---|---|---|
| 2,368,019 | 1/1945 | Guibert et al. | 73/261 |
| 3,255,630 | 6/1966 | Karlby et al. | 73/261 |
| 3,261,298 | 7/1966 | Wilson | 418/206 |
| 3,342,071 | 9/1967 | Meyers | 73/261 |
| 3,448,615 | 6/1969 | Schneider, Jr. | 73/261 |

OTHER PUBLICATIONS

"Oval Gear Engineering Co., Ltd.", Catalogue No. M-1002, 1966, p. 3.
"Smith Meters", Bulletin 1.9.1, 10-1979.
"Smith Oval Gear Meters", Brochure No. 1.9.0, 1-1980.

*Primary Examiner*—Donald O. Woodiel
*Attorney, Agent, or Firm*—Arnold, White & Durkee

[57] ABSTRACT

A gear meter is characterized by a dual magnetic drive used for driving meter accessories. The measuring gears within the gear meter are provided with driver magnets which urge the rotation of driven magnets mounted on rotatable shafts arranged within the fixed shafts about which the measuring gears rotate. The rotating shafts are coupled with gears which either correspond in shape and size to, and which are radially aligned with, the respective measuring gears, or are circular. The coupling gears combine the torque generated through the two rotating shafts to drive a meter accessory shaft.

23 Claims, 5 Drawing Figures

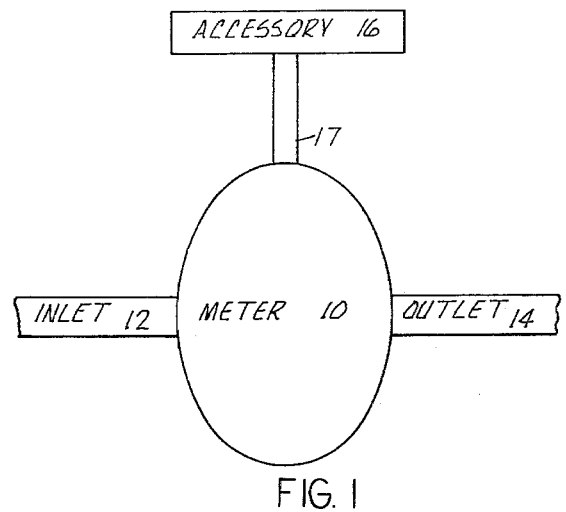
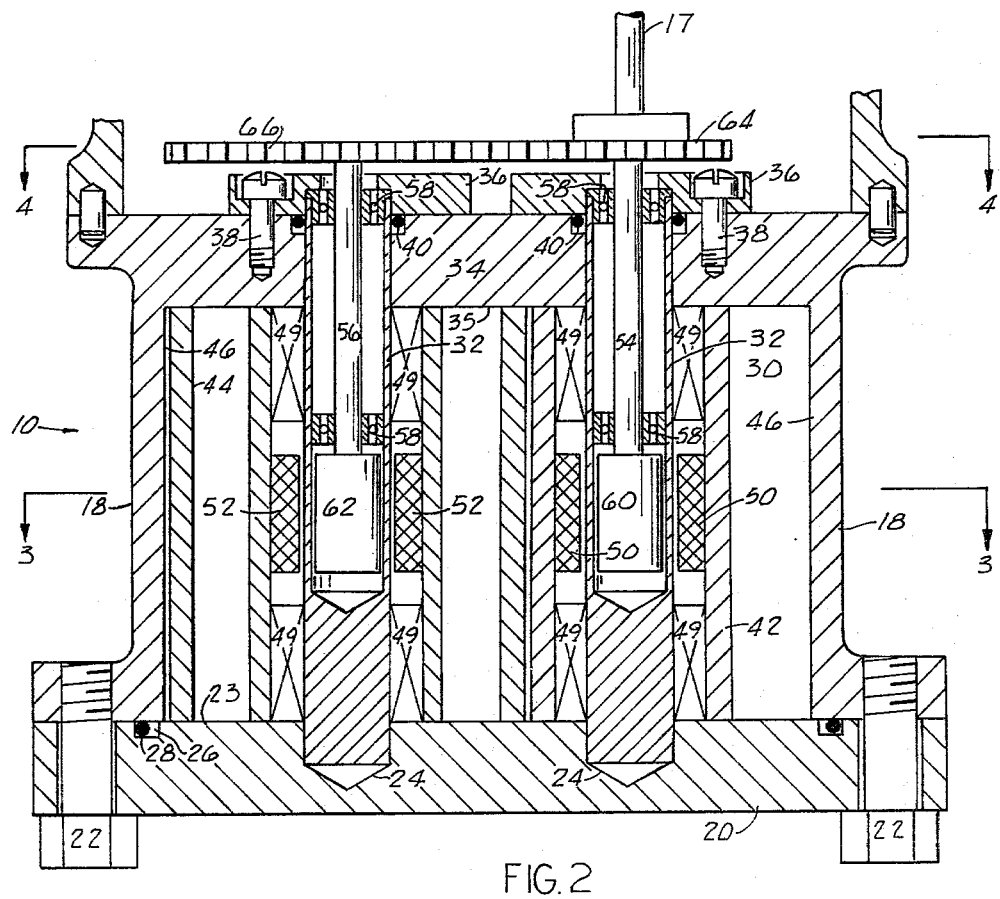

DUAL MAGNETIC DRIVE FOR GEAR METERS

BACKGROUND OF THE INVENTION

1. Field of the Invention

This invention relates generally to a dual magnetic drive for use in a gear meter. More particularly, this invention concerns the use of magnets in both measuring gears of a gear meter to drive two shafts, the torque outputs of which are operatively coupled by two gears outside the measuring chamber of the meter.

2. Description of the Prior Art

It has been common in the past to use magnetic drives in industrial meters. Such arrangements are preferred over shaft drives requiring dynamic seals. Gear-type meters lend themselves to the use of magnetic drives because it is possible to put a driver magnet in a measuring gear and a driven magnet on a rotating shaft inside a fixed hollow shaft on which the measuring gear rotates. However, previous designs have used only a single magnetic coupling in such meters. The meters described at page 3 of Catalog No. M-1002, 1966, of Oval Gear Engineering Co., Ltd., are believed exemplary of such a single magnetic coupling. While this arrangement has exhibited at least a degree of utility in larger meters, it is believed that room for significant improvement remains.

Generally, a single magnetic drive has been adequate in meters where the components are large enough that they can generate sufficient torque through the magnetic drive to operate meter accessories such as a volume indicator, a preset counter, or a pulse transmitter. However, as the need for, and the use of smaller meters has developed, the parts or components thereof have also become smaller. The result has been that a point is reached where the torque produced by a single magnetic drive is not sufficient to operate the same meter accessories previously driven on larger meters.

In the past, as gear meters were made smaller, one of the following results occurred. First, fewer or no mechanical accessories were driven by the meter. In these situations, it was necessary to resort, for example, to the use of electrical signals to record rotations of the measuring gears in order to calculate the volume of fluid passing through the meter. Alternatively, larger magnetic drives were used. However, these drives have been located outside of the measuring gear in order not to have to reduce the accessory load that the meter can operate. This approach required that more parts be used, and, in some cases, that more parts be subjected to the measured fluid. For example, attention is directed to U.S. Pat. Nos. 3,255,630 (Karlby) and 3,448,615 (Schneider) which appear to disclose single magnetic drives located outside the measuring chambers. The consequence is an increased complexity and cost. Furthermore, the consequences are the same whether the larger driver magnet is attached directly to the measuring gear or is indirectly driven by the measuring gear.

In most instances, the measuring gears or rotors used in meters for measuring the flow of fluids are bilobar or oval shaped bodies such as described in U.S. Pat. No. 2,368,019 (Guibert). These rotors are caused to be rotated about their axes by the passage of the fluid through the measuring chamber. Magnetic coupling has been utilized wherein one of the rotors, rotating about a hollow shaft, is used to magnetically drive another shaft arranged within the hollow shaft. However, because of the shape and alignment of the rotors within the measuring chamber, the speed of each of the measuring rotors varies during each 360 degree rotation. Due to this variation in speeds of the measuring rotors, utilization of both rotors to drive "accessory" shafts did not appear feasible such that an increased "accessory torque" (over that produced by a single rotor drive) could be generated. Consequently, the use of a dual magnetic drive, that is, the use of a driving magnet in each of the measuring rotors, required the development of an arrangement which would make the torques produced by the two rotors of varying angular acceleration additive, and not counter-productive. This problem is believed to have been solved by the invention described herein.

The problems enumerated in the foregoing are not intended to be exhaustive but rather are believed to be among many which may tend to impair the effectiveness of previously known gear meters. Other noteworthy problems may also exist; however, those presented above should be sufficient to demonstrate that the gear meter systems which appear in the art have not been altogether satisfactory as the need to use smaller gear meters has developed.

Recognizing the need for an improved arrangement for driving gear meter accessories, it would be advantageous to provide a dual magnetic drive for gear meters which minimizes or reduces the problems of the type previously noted. More particularly, it would be advantageous to be able to increase the amount of torque that can be transmitted by magnetic drives in a gear meter such that smaller gear meters may drive the same meter accessories previously driven by larger meters. Another advantage to be achieved is increased economy and efficiency in gear meters where fewer parts and mechanisms are needed and where fewer parts are subjected to the measured fluid such that measuring accuracy is not hindered or reduced.

SUMMARY OF THE INVENTION

A gear meter employing a dual magnetic drive of the present invention includes a casing having a chamber therein. A fluid inlet and a fluid outlet are provided to conduct the fluid to be measured into and out of the chamber. A pair of hollow fixed shafts extend through the chamber. At least one end of each hollow shaft is open to the area outside the chamber walls. A measuring gear is rotatably mounted on each of the fixed shafts within the chamber. In most cases these are oval or bilobar-type rotors known and used in the art. The measuring gears, or rotors, are dimensioned such that when they are mounted on the fixed shafts, they are in continuous engagement with one another and at the same time they are each in a continuous dynamic sealing arrangement with the chamber walls. In carrying out the invention, an arrangement of magnets is utilized wherein a driver magnet is positioned in each of the measuring gears. As described hereinafter, a driven magnet is arranged within each hollow shaft. The driver magnet is constructed within the measuring gear in a position along the length of and surrounding the measuring gear's shaft bore.

The passage of fluid through the chamber causes the measuring gears or rotors to rotate about the fixed hollow shafts.

A rotating shaft is arranged inside each of the fixed hollow shafts and extends through the open end thereof to the area outside the casing. The rotating shafts may be mounted within the fixed shafts in any known manner, such as on ball bearings or in sleeve bearings.

Driven magnets are affixed to or arranged as part of the rotating shafts. The rotating shafts are positioned in the hollow shafts such that the driven magnets are aligned with the driver magnets in the measuring gears and therefore are urged to follow the rotation of the measuring gears.

In view of the operating relationship between the measuring gears or oval rotors within the chamber, each rotor goes through a cyclic change in speed during each rotation. When the two rotors are aligned such that the major axis of one is perpendicular to and contacting the minor axis of the other, the rotors are "out of phase" with one another by 90°. Due to the variation in the speeds of the two rotors, the "out of phase" alignment is not always 90° but will vary during those periods of the cycle where the respective major and minor axis of the rotors are not in contact. Despite the variation in speeds of the rotors, it has been found that they do not generally move more than 16° to 18° out of the 90° displacement occurring when their respective major and minor axes are in contact. The coupling arrangement of this invention, utilizing magnets, allows variation in the angular distance which the driven magnets run behind the driver magnets such that the shafts of the driven magnets may be coupled with circular gears running at a compromise rotational speed despite the varying speeds of the measuring gears.

The circular coupling gears are mounted to each rotating shaft at a point outside the chamber walls. Pursuant to this arrangement, the meshing of the circular coupling gears acts to combine the torque outputs of the two rotating shafts so that approximately twice the torque is available for transmission through an accessory shaft than could be obtained from either rotating shaft individually. A meter accessory shaft journalled to the circular coupling gears is then operably connected to drive the desired meter accessory or accessories.

In another feature of this invention, the torque produced by the measuring gears or rotors may be coupled in an additive manner by using coupling gears on the rotating shafts which correspond in perimeter shape and size to the measuring gears and which are aligned radially with their respective measuring gears.

Examples of the more important features of this invention have thus been summarized rather broadly in order that the detailed description that follows may be better understood, and in order that the contribution to the art may be better appreciated.

BRIEF DESCRIPTION OF THE DRAWINGS

Additional features and advantages of the present invention will become apparent with reference to the following detailed description of a preferred embodiment thereof in connection with the accompanying drawings wherein like reference numerals have been applied to like elements, in which:

FIG. 1 shows a schematic of an environment for the invention;

FIG. 2 depicts a side elevation view entirely in section showing a preferred embodiment of this invention;

DETAILED DESCRIPTION OF THE INVENTION

Figure 3:
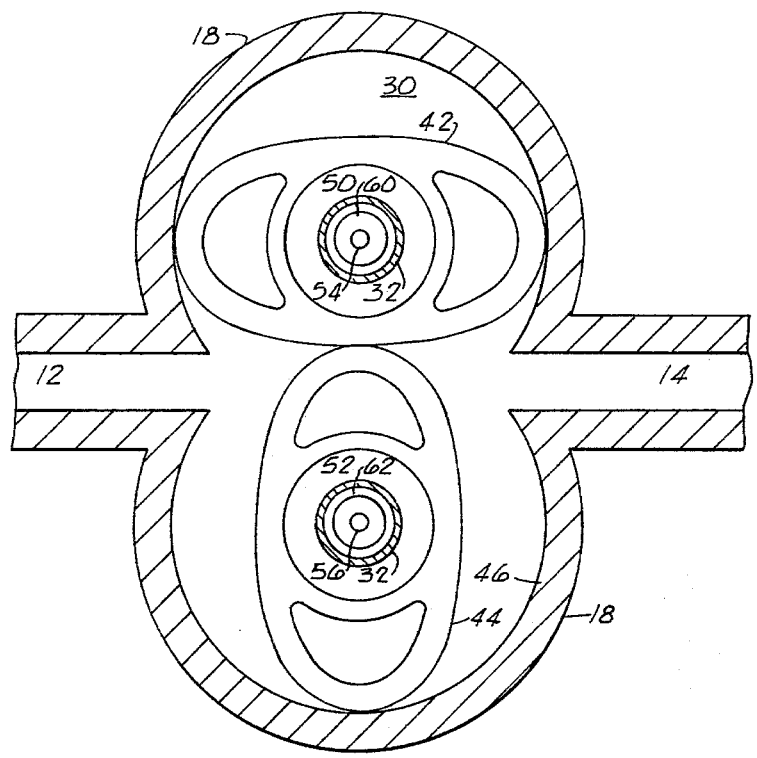
FIG. 3 is a cross sectional view taken along section line 3—3 in FIG. 2.
Figure 4:
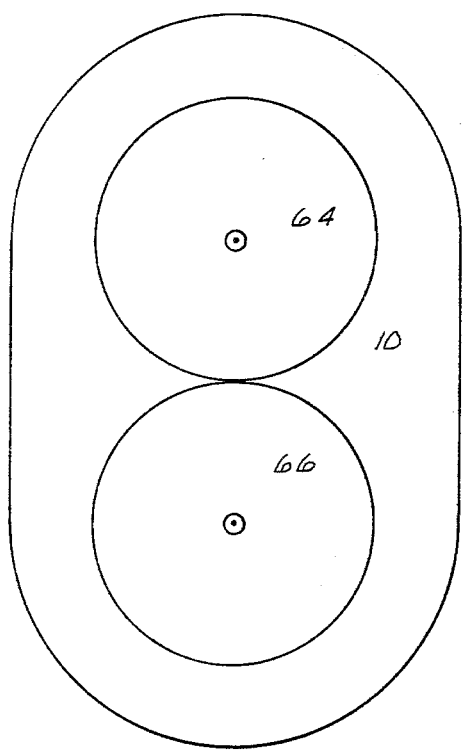
FIG. 4 is a cross sectional view taken along section line 4—4 in FIG. 2.

FIG. 1 depicts a schematic of a gear meter 10 having a fluid inlet 12 and a fluid outlet 14. The meter 10 is operably connected through a coupling shaft 17 to drive a meter accessory 16, such as a volume indicator. Of course, other accessories such as a preset counter may also be operatively connected to and driven by the meter 10 through the coupling shaft 17.

Turning then to FIG. 2, there is shown in detail a gear meter 10 having a dual magnetic drive in accordance with the invention. The meter casing 18 is provided with an end plate 20, which end plate is secured to the meter casing by bolts 22. The internal side 23 of the end plate is provided with shaft receiving recessions 24 and an annular groove 26. Within the groove 26 is provided an O-ring seal 28. The interior surfaces of the meter casing 18 and end plate 20 combine to form a measuring chamber 30.

The chamber 30 communicates with the inlet 12 and outlet 14 (FIG. 1) in a manner appreciated by those skilled in the art.

Fixed hollow shafts 32 extend through measuring chamber 30 and are secured in the shaft receiving recessions 24 of end plate 20. These shafts extend through wall 34 of casing 18. The interior surface of the wall 34 is indicated by reference character 35. The hollow shafts are retained in the casing by ring plates 36 and screws 38. The casing 18 is also provided with seals 40 at the point where hollow shafts 32 exit from the casing. The hollow shafts are constructed of a non-magnetic material.

Within measuring chamber 30, oval rotors 42 and 44 are rotatably mounted on hollow shafts 32. The arrangement of rotors 42 and 44 with respect to one another when the major axis of rotor 44 is in contact with the minor axis of rotor 42 is depicted in FIG. 3. As further illustrated therein, the rotors are designed and arranged within the measuring chamber 30 so that they continuously engage one another and such that each rotor is in continuous dynamic sealing arrangement with chamber side wall 46. The end portions of rotors 42 and 44 are also in a dynamic sealing arrangement with chamber end walls defined by the interior surface 23 of the end plate 20 and the interior surface 35 of the wall 34. Pursuant to this arrangement, the meter permits the passage of a predetermined volume of fluid with each revolution of the rotors.

Oval rotors 42 and 44 receive the fixed shafts through central axial bores. As depicted in FIG. 3, the oval rotors have cylindrical driver magnets 50 and 52 built into their core concentric to their central bore and between supporting journal bearings 49. The length and size of these driver magnets may vary.

Extending into hollow shafts 32 are rotatable shafts 54 and 56. These rotatable shafts are supported by bearings 58 at appropriate points within the hollow shaft. Rotatable shafts 54 and 56 are provided with driven magnets 60 and 62, respectively, which are arranged thereon so that when the rotatable shafts are in place, driver magnets 50 and 52 magnetically cooperate with driven magnets 60 and 62.

More specifically, in this preferred embodiment, the driver magnets 50 and 52 are in longitudinal alignment with the driven magnets 60 and 62 respectively (FIG. 2). The longitudinal alignment of the driver magnets and driven magnets eliminates end thrust problems and subsequent friction involving the oval rotors. Pursuant to this arrangement, the rotation of the oval rotors and the driver magnets situated therein causes the rotation of the driven magnets and the shafts of which they are a part.

The oval rotors 42 and 44 respectively rotate at nonuniform rates. For example, for a set of oval rotors having the minor axis equal to about 0.57 of the length of major axis, the speed of the first rotor versus the second may vary from 0.57 times the speed of the second to 1.75 (1/0.57) times as fast. However, even for this variation in speeds, it is found that neither rotor ever gets more than 16° to 18° ahead or behind the other from the position depicted in FIG. 3, that is, displaced more than 16° to 18° from the 90° displacement which exists when the major axis of one rotor is in contact with the minor axis of the other.

The driver magnets 50 and 52 and the driven magnets 60 and 62 utilized in this invention may be four pole cylindrical magnets, wherein the polarity changes each 90° about the circumference of each cylindrical magnet. The driven magnets, when the measuring gears are in the position depicted in FIG. 3, are aligned north poles to the south poles of the driver magnets and south poles to the north poles thereof. In this arrangement, the driver magnet can lead its respective driven magnet by as much as 90° before the magnetic drive would "slip back." This is more than enough latitude to accommodate the 16° to 18° displacement which occurs between the measuring gears during any one revolution. This allows the rotatable shafts 54 and 56 to be coupled by circular gears 64 and 66 which will operate at a compromise rotational speed and yet additively transmit the torque being magnetically passed from the individual measuring gears to the respective rotating shaft. Consequently, the dual magnetic drive with circular coupling gears may drive approximately two times the torque of just one of its magnetic drives.

Figure 5:
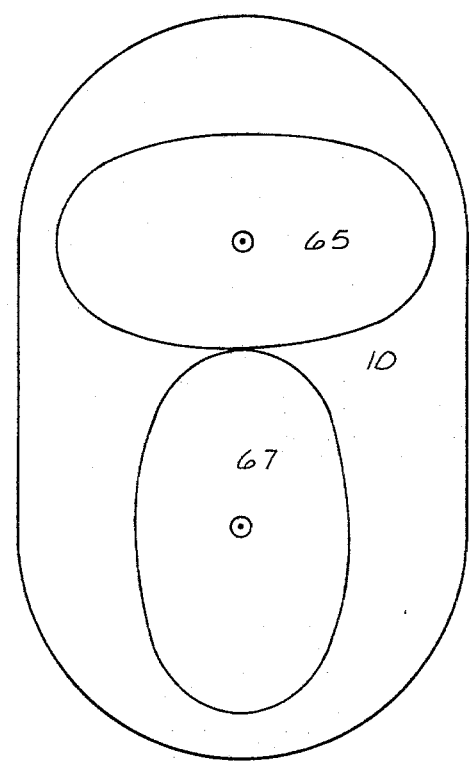
FIG. 5 is a cross sectional view of another embodiment of this invention taken along section line 4—4 in FIG. 2 wherein coupling gears which correspond in perimeter size and shape and which are radially aligned with their respective measuring gears are utilized.

In another aspect of the invention, the rotating shafts are coupled by gears 65 and 67, depicted in FIG. 5, which gears correspond in perimeter size and shape with oval rotors 42 and 44 respectively. Furthermore, these coupling gears are radially aligned with their respective oval rotors. This particular arrangement combines the torque outputs of the rotatable shafts in varying amounts depending upon the position of the coupling gears 65 and 67.

The drawings in FIGS. 3 and 5 respectively represent the alignment of the oval rotors within the measuring chamber 30 depicted in FIG. 2 and the radial alignment of the coupling gears outside the measuring chamber at a given moment. As is clear from these drawings, each coupling gear is situated on its rotatable shaft such that its position is the same as that of the rotor with which it is coaxial.

The foregoing description of the invention has been directed in primary part to a particular preferred embodiment in accordance with the requirements of the Patent Statutes and for purposes of explanation and illustration. However, it will be apparent to those skilled in this art that modifications and changes in both apparatus and method may be made without departing from the scope and spirit of the invention. For example, the rotatable shafts may be extended beyond the hollow shafts on both sides of the measuring chamber, with coupling gears mounted on each side to combine and transmit torque to two separate meter accessory shafts. Furthermore, magnets of different polar arrangements such as 2-pole magnets, 6-pole magnets, etc. could be utilized. These, and other modifications of the invention will be apparent to those skilled in this art. It is the applicant's intention in the following claims to cover all such equivalent modifications and variations which fall within the true spirit and scope of the invention.

What is claimed is:

1. A gear meter, comprising:
   a casing having a chamber, the casing having a fluid inlet and a fluid outlet communicating with the chamber;
   a pair of fixed hollow shafts extending through the chamber;
   a measuring gear rotatably mounted on each of the fixed shafts within the chamber so as to continuously engage one another and so as each measuring gear is in continuous dynamic sealing arrangement with the chamber walls;
   a driver magnet arranged in each measuring gear; and
   a drive transmission for operably connecting the measuring gears to a meter accessory wherein the drive transmission comprises:
      rotatable shafts arranged inside the fixed, hollow shafts and extending beyond the measuring chamber;
      driven magnets fixed to the rotatable shafts such that the rotation of the measuring gears and driver magnets urges the rotation of the driven magnets and rotatable shafts; and
      a coupling gear mounted to each of the rotatable shafts outside the measuring chamber, said coupling gears being adapted for connection to a meter accessory.

2. The gear meter of claim 1, wherein the measuring gears are oval rotors.

3. The gear meter of claim 1, wherein the driver and driven magnets are cylindrically shaped four pole magnets.

4. The gear meter of claim 1, wherein the coupling gears are circular gears.

5. The gear meter of claim 1, wherein the meter accessory is a means for indicating fluid volume.

6. The gear meter of claim 1, wherein the coupling gears correspond in perimeter shape and size with the measuring gears and are radially aligned with the respective measuring gears.

7. The gear meter of claim 1, wherein the coupling gears are operable to drive multiple accessory shafts and accessories.

8. A gear meter, comprising:
   a casing having a chamber, the casing having a fluid inlet and a fluid outlet communicating with the chamber;
   a pair of fixed hollow shafts extending through the chamber;
   a measuring gear rotatably mounted on each of the fixed shafts within the chamber so as to continuously engage one another and so as each measuring gear is in continuous dynamic sealing arrangement with the chamber walls;
   a driver magnet arranged in each measuring gear; and
   a drive transmission for operably connecting the measuring gears to a meter accessory wherein the drive transmission comprises:

rotatable shafts arranged inside the fixed, hollow shafts and extending beyond the measuring chamber;

driven magnets fixed to the rotatable shafts such that the rotation of the measuring gears and driver magnets urges the rotation of the driven magnets and rotatable shafts; and a circular coupling gear mounted to each of the rotatable shafts outside the measuring chamber, said coupling gears being adapted for connection to a meter accessory.

9. The gear meter of claim 8, wherein the measuring gears are oval rotors.

10. The gear meter of claim 8, wherein the driver and driven magnets are cylindrically shaped four pole magnets.

11. The gear meter of claim 8, wherein the meter accessory is a means for indicating fluid volume.

12. The gear meter of claim 8, wherein the coupling gears are operable to drive multiple accessory shafts and accessories.

13. A gear meter of the type having a casing which defines a chamber, the casing having a fluid inlet and a fluid outlet communicating with the chamber, a pair of hollow fixed shafts extending through the chamber, and a measuring gear rotatably mounted on each of the fixed shafts within the chamber so as to continuously engage one another and so that each measuring gear is in continuous dynamic sealing arrangement with the chamber walls, wherein the improvement comprises:

a driver magnet arranged in each measuring gear; and a drive transmission for operably connecting the measuring gears to a meter accessory wherein the drive transmission comprises:

rotatable shafts arranged inside the fixed, hollow shafts and extending beyond the measuring chamber;

driven magnets fixed to the rotatable shafts such that the rotation of the measuring gears and driver magnets urges the rotation of the driven magnets and rotatable shafts; and a coupling gear mounted to each of the rotatable shafts outside the measuring chamber, said coupling gears being adapted for connection to a meter accessory.

14. The gear meter of claim 13, wherein the measuring gears are oval rotors.

15. The gear meter of claim 13, wherein the meter accessory is a means for indicating fluid volume.

16. The gear meter of claim 13, wherein the driver and driven magnets are cylindrically shaped four pole magnets.

17. The gear meter of claim 13, wherein the coupling gears are circular gears.

18. The gear meter of claim 13, wherein the coupling gears correspond in perimeter shape and size with the measuring gears and are radially aligned with the respective measuring gears.

19. The gear meter of claim 13, wherein the coupling gears are operable to drive multiple accessory shafts and accessories.

20. A method of transmitting and adding the torque from two cooperatively engaged measuring gears rotating on fixed shafts within a sealed chamber, which comprises:

magnetically urging the rotation of a shaft within the fixed shaft about which each measuring gear rotates through the use of four pole magnets; and coupling the two magnetically urged shafts with circular coupling gears.

21. A method of transmitting and adding the torque from two cooperatively engaged measuring gears rotating on fixed shafts within a sealed chamber, which comprises:

magnetically urging the rotation of a shaft within the fixed shaft about which each measuring gear rotates; and coupling the two magnetically urged shafts with gears which correspond in perimeter shape and size to the measuring gears and which are radially aligned with the respective measuring gears.

22. A method as recited in claims 20 or 21, wherein the step of magnetically urging the rotation of a shaft within the fixed shaft includes arranging driver magnets in the measuring gears within the sealed chamber and arranging driven magnets on the rotating shafts.

23. The method of claims 20 or 21 further comprising the step of operably connecting the coupling gears to drive an accessory shaft.

* * * * *